(12) United States Patent
Arya

(10) Patent No.: US 6,433,967 B1
(45) Date of Patent: Aug. 13, 2002

(54) TRANSDUCER SUSPENSION SYSTEM HAVING A RIGID EXTENSION SECTION

(75) Inventor: Satya Prakash Arya, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1134 days.

(21) Appl. No.: 08/825,424

(22) Filed: Mar. 28, 1997

Related U.S. Application Data

(63) Continuation of application No. 08/825,424, filed on Mar. 28, 1997, which is a continuation of application No. 08/587,066, filed on Jan. 16, 1996, now abandoned.

(51) Int. Cl.$^7$ .................................................. G11B 5/48
(52) U.S. Cl. .................................. 360/244.8; 360/244.9
(58) Field of Search ................................ 360/104, 105, 360/106, 244.2, 244.8, 244.9

(56) References Cited

U.S. PATENT DOCUMENTS

| 4,167,765 A | 9/1979 | Watrous ..................... 360/103 |
| 4,996,616 A | 2/1991 | Aoyagi et al. ............... 360/104 |
| 5,126,904 A | 6/1992 | Sakurai ....................... 360/104 |
| 5,313,353 A | 5/1994 | Kohso et al. ................ 360/104 |
| 5,313,355 A | 5/1994 | Hagen ......................... 360/104 |
| 5,353,181 A | * 10/1994 | Frater et al. ................. 360/104 |
| 5,408,372 A | 4/1995 | Karam, II .................... 360/104 |

FOREIGN PATENT DOCUMENTS

| EP | 0487914 | * 6/1992 | ................. 360/104 |
| JP | 60-025073 | 2/1985 | |
| JP | 60136979 | * 7/1985 | ................. 360/104 |
| JP | 60-226080 | 11/1985 | |
| JP | 3-219473 | 9/1991 | |
| JP | 4-313870 | 11/1992 | |

OTHER PUBLICATIONS

IBM TDB vol. 36, No. 4 "Suspension Assembly with Torsion–Proof Stiffners" by T. Satoh et al Apr. 1993.
NHK Spring Co., Ltd. Sep. 27, 1993.

* cited by examiner

*Primary Examiner*—William Korzuch
(74) *Attorney, Agent, or Firm*—Douglas R. Millett

(57) ABSTRACT

A suspension system comprises a first rigid beam section having a first portion for connection to an actuator arm. The first rigid beam section having at least one stamped ridge which extends past the edge of an actuator arm and along the length of the first rigid section. A flexible spring section is connected to the first rigid section and a second rigid section is connected to the spring section, the second rigid section having a transducer assembly receiving portion for receiving a transducer assembly.

16 Claims, 3 Drawing Sheets

TRANSDUCER SUSPENSION SYSTEM HAVING A RIGID EXTENSION SECTION

This is a continuation of U.S. application Ser. No. 08/825,424 filed Mar. 28, 1997 which is a continuation of U.S. application Ser. No. 08/587,066 filed Jan. 16, 1996 now abandoned.

BACKGROUND OF THE INVENTION

1. Field of the Invention

This invention relates generally to transducer suspension systems and more particularly to a suspension system having reinforcing stamped recesses.

2. Description of the Prior Art

Direct access storage devices (DASD), otherwise known as disk drives, store information on concentric tracks of a rotatable magnetic recording disk. A magnetic head or transducer element is moved from track to track to record and read the desired information. Typically, the magnetic head is positioned on an air bearing slider which flies above the surface of the disk as the disk rotates. In some recently proposed disk drives, the slider (or carrier) rides on a liquid film or bearing on the disk. A suspension assembly connects the slider to a rotary or linear actuator. The suspension provides support for the slider.

The suspension must meet several requirements. It must have a gimbal assembly in order to allow the slider to pitch and roll as it adjusts to the air bearing created between the slider and the rotating disk. The suspension must also have a flexible spring section to provide a bias force in the vertical direction. This is necessary to provide a compensating force to the lifting force of the air bearing in order to keep the slider at the desired height above the disk. Also, the suspension must have a rigid load beam section between the gimbal assembly and the spring section in order to prevent unwanted displacement.

Examples of suspension systems are shown in U.S. Pat. No. 5,408,372 issued Apr. 18, 1995 to Karam; U.S. Pat. No. 5,313,355 issued May 17, 1994 to Hagen; U.S. Pat. No. 5,313,353 issued May 17, 1994 to Kohso et al; U.S. Pat. No. 5,126,904 issued Jun. 30, 1992 to Sakurai; U.S. Pat. No. 4,996,616 issued Feb. 26, 1991 to Aoyagi et al; U.S. Pat. No. 4,167,765 issued Sep. 11, 1979 to Watrous; Japanese Patent Application 4-313870 published Nov. 5, 1992 by Mori; Japanese Patent Application 3-219473 published Sep. 26, 1991 by Kuwamoto; Japanese Patent Application 60-226080 published Nov. 11, 1995 by Okuwaki; Japanese Patent Application 60-025073 publish Feb. 7, 1995 by Masanobu; IBM Technical Disclosure Bulletin Vol. 36, No. 4, April 1993, page 71 by Satoh et al; and NHK NP30 product specification sheet dated Sep. 27, 1993.

In the past, each disk drive maker has had to design their own suspension for their own drives. Each type of drive tended to use its own special suspension design. One reason for this is that if the length of the suspension is varied, then the dynamic characteristics of the suspension also change. This resulted in the need to redesign each suspension for every change in suspension length. Another related problem is that the past designs tended to have a relatively large and thick actuator arm which projected towards the disk and to which the suspension was attached. In order to obtain desirable frequency response characteristics in the suspension, the actuator arm was extended as far as possible towards the disk. However, this large actuator arm contributes to the mass of the actuator which in turn slows the actuator's speed and results in relatively slower data access times.

What is needed is a suspension design which provides for a variable length suspension and which reduces the length of the actuator arm.

SUMMARY OF THE INVENTION

Briefly, in a preferred embodiment of the present invention, a suspension system comprises a first rigid beam section having a first portion for connection to an actuator arm. The first rigid beam section has at least one stamped ridge which extends over the actuator arm and along the length of the first rigid section. A flexible spring section is connected to the first rigid section. A second rigid section is connected to the spring section and has a transducer assembly receiving portion for receiving a transducer assembly.

The stamped ridge provides great stiffness to the first rigid section and in effect extends the stiffness of the actuator arm out through the first rigid section to the beginning to the spring section. Thus, the actuator arm does not need to extend as far. The spring section and the second rigid section may be of a standard length such that the overall length of the suspension may be varied by simply changing the length of the first rigid section without substantially changing the dynamic characteristics of the suspension.

For a fuller understanding of the nature and advantages of the present invention, reference should be made to the following detailed description taken in conjunction with the accompanying drawings.

DESCRIPTION OF THE PREFERRED EMBODIMENTS

Figure 1:
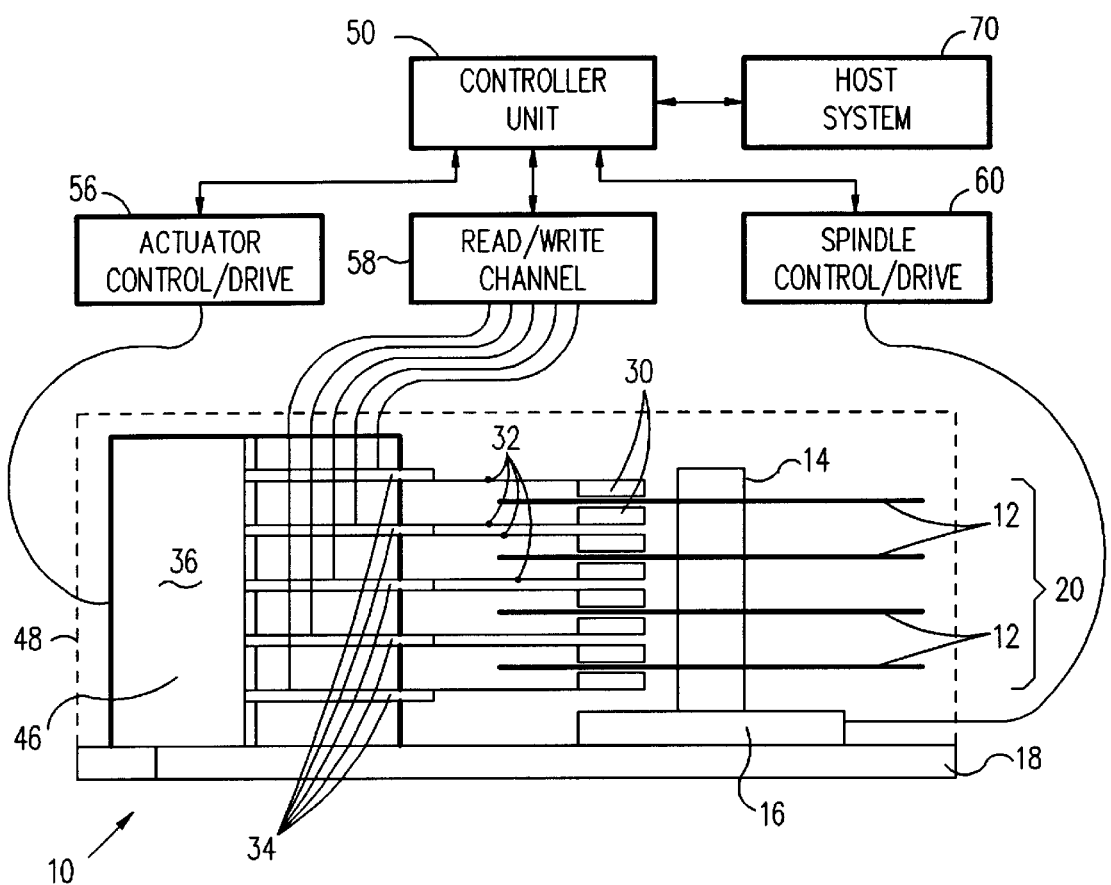
FIG. 1 is a schematic diagram of a data storage system of the present invention.
Figure 2:
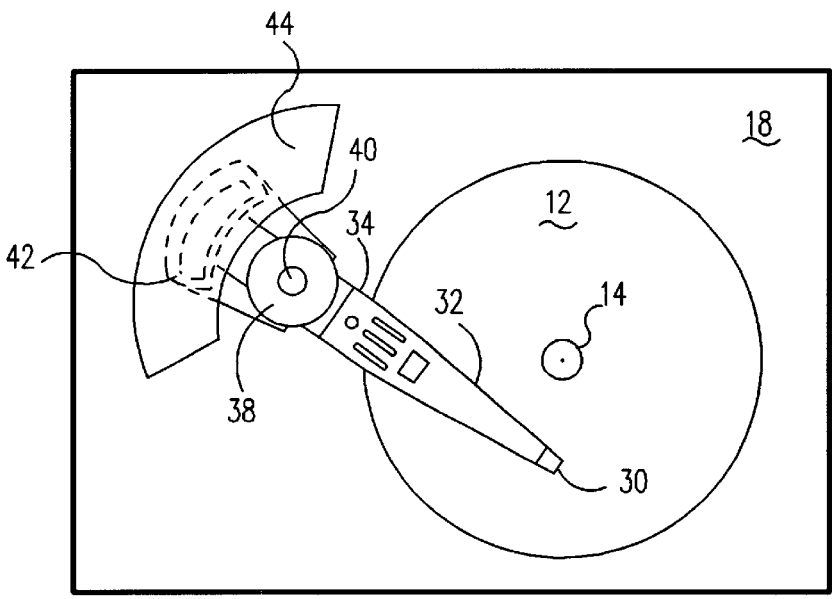
FIG. 2 is a top view of the system of FIG. 1.

FIGS. 1 and 2 show schematic diagrams of a data storage system of the present invention which is designated by the general reference number 10. System 10 comprises a plurality of magnetic recording disks 12. Each disk 12 has a plurality of concentric data tracks. Disks 12 are mounted on a spindle shaft 14 which is connected to a spindle motor 16. Motor 16 is mounted to a chassis 18. The disks 12, spindle 14 and motor 16 comprise a disk stack assembly 20.

A plurality of read/write heads 30 are positioned over the disks 12 such that each surface of the disks 12 has a corresponding head 30. Each head 30 is attached to one of the plurality of suspensions 32 which in turn are attached to a plurality of actuator arms 34. Arms 34 are connected to a rotary actuator 36. Alternatively, the arms 34 may be an integral part of a rotary actuator comb. Actuator 36 moves the head in a radial direction across the disks 12. Actuator 36 typically comprises a rotating member 38 mounted to a rotating bearing 40, a motor winding 42 and motor magnets 44. Actuator 36 is also mounted to chassis 18. The heads 30, suspensions 32, arms 34, and actuator 36 comprise an actuator assembly 46. The disk stack assembly 20 and the actuator assembly 46 are sealed in an enclosure 48 (shown by a dashed line) which provides protection from particulate contamination.

A controller unit 50 provides overall control to system 10. Controller unit 50 typically contains a central processing unit (CPU), memory units, timing units, and other digital circuitry. Controller 50 is connected to an actuator control/drive unit 56 which in turn is connected to actuator 36. This allows controller 50 to control the movement of heads 30 over disks 12. The controller 50 is connected to a read/write channel 58 which in turn is connected to the heads 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 70 may send digital data to controller 50 to be stored on disks 12, or may request that digital data be read from the disk 12 and sent to system 70. The basic operation of DASD units is well known in the art and is described in more detail in *Magnetic Recording Handbook*, C. Dennis Mee and Eric D. Daniel, McGraw Hill Book Company, 1990.

Figure 3:
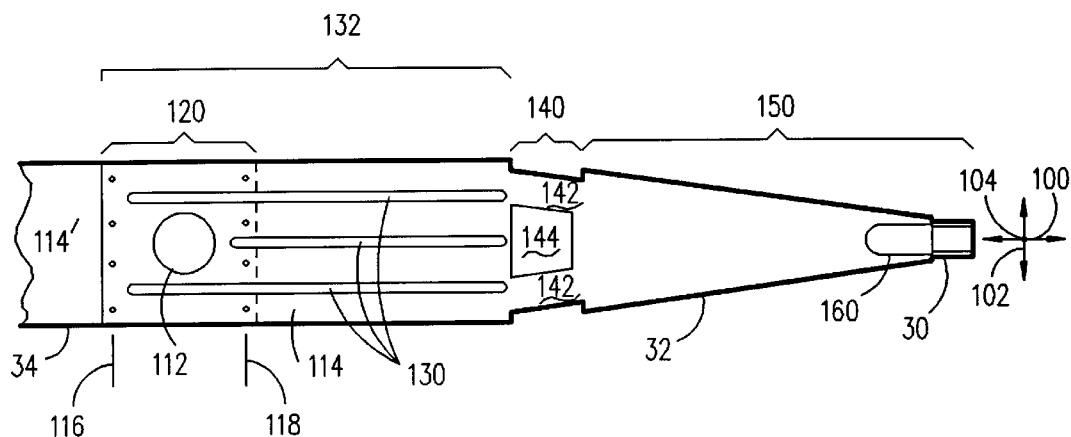
FIG. 3 is a bottom view of the suspension of FIG. 1.
Figure 4:
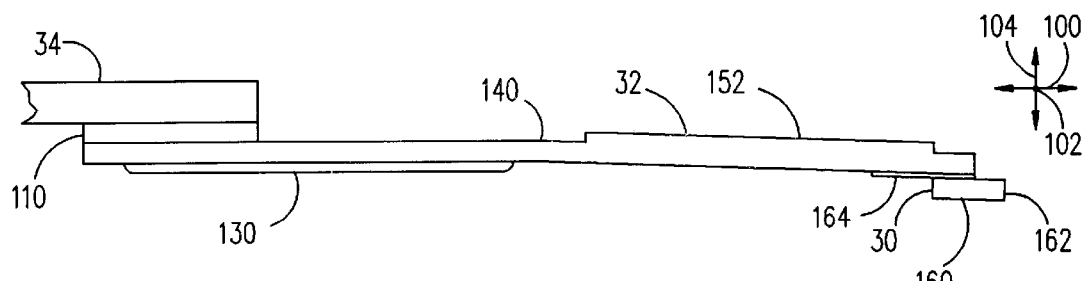
FIG. 4 is a side view of the suspension of FIG. 1.

FIGS. 3 and 4 show a bottom and side view, respectively, of the suspension 32. The suspension 32 has a longitudinal axis 100, a lateral axis 102 and a vertical axis 104. The actuator arm 34 extends from the actuator 36. The arm 34 is typically made of stainless steel and is between 1.5 mm and 0.6 mm thick. A mount block 110 is attached below arm 34. Mount block 110 is made of stainless steel and is between 0.5 mm and 0.2 mm thick. Suspension 32 is attached below mount plate 110. Suspension 32 is preferably made of a stainless steel sheet material which is between 0.038 mm and 0.076 mm thick.

In a preferred embodiment, arm 34, mount plate 110 and suspension 32 have a through hole 112. Mount plate 110 has a swage spud (not shown) which extends into hole 112 of arm 34 and is swage attached by passing a swage ball through hole 112 such that the swage spud is compress fitted to the inside of hole 112 of arm 34. Suspension 32 is attached to mount plate 110 by a series of welds located at weld spots 114. The rearward welds 114 are arranged along a rearward lateral weld line 116 and the forward welds 114 are arranged along a forward lateral weld line 118. The portion of suspension 32 which contains the welds 114 and which overlaps the mount plate 110 and the arm 34 is the support attachment portion 120.

The suspension 32 has a plurality of ridges or ribs 130 which are made by stamping recesses in the opposite side. The ridges 130 are preferably continuous ridges which run in a direction parallel to the longitudinal axis 100. The ridges 130 are located in the interior area of the suspension 32. The ridges 130 extends into support attachment portion 120 and pass beyond weld line 118. Some of ridges 130 also preferably extend past the swage hole 112. The ridges 130 provide rigidity to the suspension 32. The portion of suspension 32 which contains the ridges 30 is known as the first rigid section 132.

Suspension 32 has a flexible spring section 140 which begins where the ridges 130 of first rigid section 132 end. Section 140 comprises a pair of spring legs 142 which surround a spring hole 144. Section 140 provides a bias force in the vertical direction which compensates for the air bearing force exerted by the rotating disk.

Suspension 32 has a second rigid section 150 which runs from the spring section 140 to the distal end (the end nearest the transducer) of suspension 32. Section 150 has a pair of flange members 152 running along each edge which provide rigidity to this section.

A flexure 164 is attached to the bottom surface of suspension 32, preferably by welding. Flexure 164 is a gimbal type of device which is well known in the art. An example of such a flexure is shown in U.S. Pat. No. 4,167,765 by Watrous. The head 30 is a transducer assembly comprising an air bearing slider 160 having a magnetic transducer 162 attached to its end side. The flexure 164 allows slider 160 to pitch and roll as needed to maintain its proper air bearing orientation during operation.

The operation of suspension 32 may now be understood. The first rigid section 132 acts as a rigid extension of the arm 34, but without the mass of the arm 34. The stamped ridges 130 provide the necessary stiffness. The rigid section 132 is prevented from moving up or down along vertical axis 104 because the ridges 130 run along its longitudinal length and the rigid section 132 is prevented from twisting about longitudinal axis 100 because the ridges 130 are located in the interior area. The shorter the distance from spring 140 to the end of section 150, the higher the dynamic response of the suspension 32. A high dynamic response is desirable because the actuator 36 typically operates at a relatively low frequency. The first rigid section 132 allows the suspension 32 to be designed such that the length of sections 140 and 150 is kept to a minimum. This also enables the length of the suspension 32 to be varied by adding length to the rigid section 132 as desired. However, because the rigid section 132 acts as an extension of the rigid actuator arm 34, the dynamic response of the suspension 32 will remain substantially the same.

Figure 5:
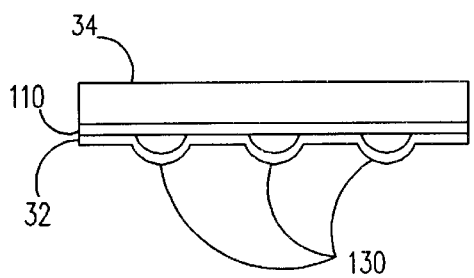
FIG. 5 is a cross sectional view of the system of FIG. 1.

FIG. 5 shows a cross sectional view of suspension 32 taken along weld line 118. Note that the stamped ridges 130 form an enclosed chamber between suspension 32 and mount plate 110 along a plane parallel to a plane containing the lateral axis 102 and vertical axis 104 (a plane perpendicular to the longitudinal axis 100).

Figure 6:
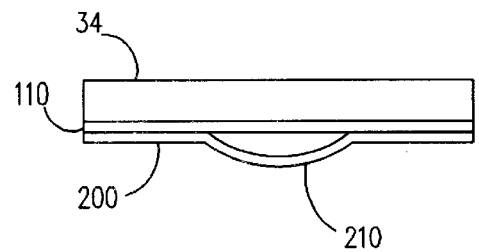
FIG. 6 is a cross sectional view of an alternative embodiment of the present invention.

FIG. 6 shows a cross sectional view of an alternative embodiment of the suspension of the present invention and is designated by the general reference number 200. Suspension 200 is similar to suspension 32 except that it has a single stamped ridge 210 instead of the plurality of ridges 130. Ridge 210 is shown as a longitudinal ridge which runs along a central longitudinal direction of suspension 32. However, the ridge 210 may run in any other direction in order to achieve the best stiffness for a given design. The length of the ridge 210 is otherwise similar as the ridges 130.

Figure 7:
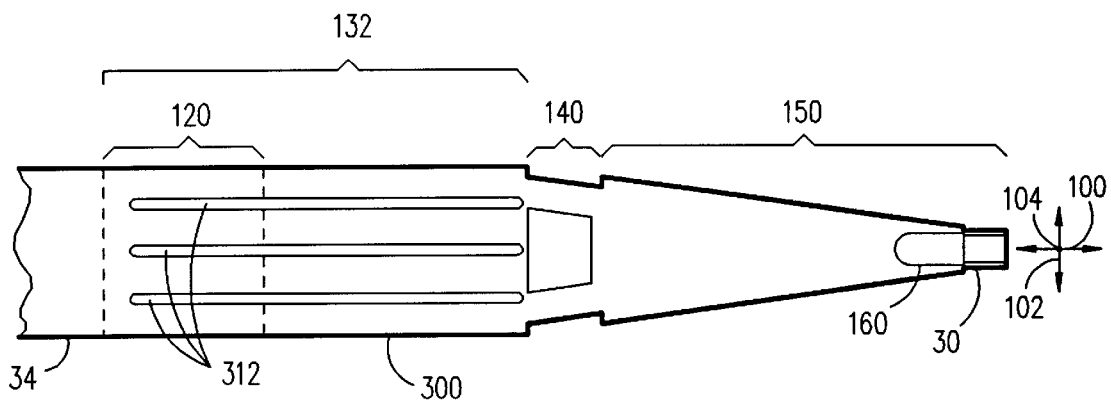
FIG. 7 is a bottom view of an alternative embodiment of the present invention.
Figure 8:
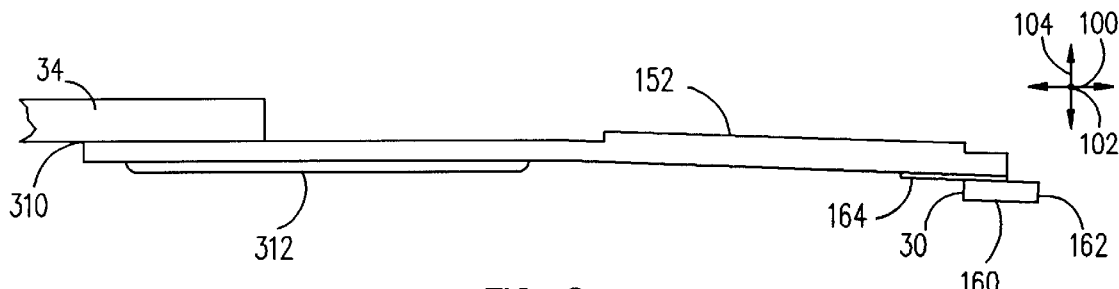
FIG. 8 is a side view of the suspension system of FIG. 7.

FIGS. 7 and 8 are a bottom and side view, respectively of an alternative embodiment of the suspension of the present invention which is designated by the general reference number 300. Suspension 300 is similar to suspension 32 with the exception that suspension 300 is glued directly to actuator arm 34 using an adhesive 310. Adhesive 310 is preferably a low viscosity epoxy and is located between support attachment portion 120 and arm 34. The mount block 110 is eliminated and there is no need for swaging. The ridges 312 are similar to ridges 130 except that now all of the ridges including the central one may extend back over arm 34 since the swage hole 112 has been eliminated. The ridges 312 should extend back towards actuator arm 34 at least past the beginning of the adhesive 310. An added advantage is that the pockets formed by ridges 312 may receive any excess adhesive.

While the preferred embodiments of the present invention have been illustrated in detail, it should be apparent that modification and adaptations to those embodiments may occur to one skilled in the art without departing from the scope of the present invention as set forth in the following claims.

What is claimed is:

1. A transducer suspension system comprising:
 a first rigid beam section having a longitudinal and a lateral axis, a first portion for connection to a support member and a second portion extending beyond the support member, the first rigid beam section having a flat planar base with a stamped ridge rising above the base and extending along an interior portion of its length from the first portion overlying the support member, through the second portion extending beyond the support member, and terminating at a position proximate to, but not inside, a flexible spring section, the stamped ridge providing stiffness to the rigid beam section to resist movement by the rigid beam in a direction perpendicular to a plane containing the longitudinal and lateral axes;
 the flexible spring section connected to the second portion of the first rigid beam section at a location a distance beyond an edge of the support member; a second rigid beam section connected to the flexible spring section; and
 a transducer assembly receiving section connected to the second rigid beam section for receiving a transducer assembly.

2. The system of claim 1, wherein the stamped ridge extends along a direction substantially parallel to the longitudinal axis.

3. The system of claim 1, further comprising a transducer assembly connected to the transducer assembly receiving section.

4. The system of claim 1, wherein the first portion is welded to the support member.

5. The system of claim 1, wherein the first portion is glued to the support member.

6. The system of claim 1, wherein the first rigid beam section and the support member form an enclosed interior chamber along a plane substantially perpendicular to the longitudinal axis.

7. The system of claim 1, wherein the first rigid beam section has a single ridge.

8. The system of claim 1, wherein the first rigid beam section has three stamped ridges.

9. A transducer suspension system comprising:
 a data storage medium;
 a transducer assembly;
 a movement device for moving the data storage medium relative to the transducer assembly;
 a positioning device for positioning the transducer assembly proximate the data storage medium;
 a first rigid beam section having a longitudinal and a lateral axis, a first portion for connection to a support member and a second portion extending beyond the support member, the first rigid beam section having a flat planar base with a stamped ridge rising above the base and extending along an interior portion of its length from the first portion overlying the support member, through the second portion extending beyond the support member, and terminating at a position proximate to, but not inside, a flexible spring section, the stamped ridge providing stiffness to the rigid beam section to resist movement by the rigid beam in a direction perpendicular to a plane containing the longitudinal and lateral axes;
 the flexible spring section connected to the second portion of the first rigid beam section at a location a distance beyond an edge of the support member;
 a second rigid beam section connected to the flexible spring section; and
 a transducer assembly receiving section connected to the second rigid beam section for receiving a transducer assembly.

10. The system of claim 9, wherein the stamped ridge extends along a direction substantially parallel to the longitudinal axis.

11. The system of claim 9, further comprising a transducer assembly connected to the transducer assembly receiving section.

12. The system of claim 9, wherein the first portion is welded to the support member.

13. The system of claim 9, wherein the first portion is glued to the support member.

14. The system of claim 9, wherein the first rigid beam section and the support member form an enclosed interior chamber along a plane substantially perpendicular to the longitudinal axis.

15. The system of claim 9, wherein the first rigid beam section has a single ridge.

16. The system of claim 9, wherein the first rigid beam section has three stamped ridges.

* * * * *